US012539076B2

(12) United States Patent
Murai

(10) Patent No.: US 12,539,076 B2
(45) Date of Patent: Feb. 3, 2026

(54) TERMINAL DEVICE, OUTPUT METHOD AND COMPUTER PROGRAM

(71) Applicant: PARAMOUNT BED CO., LTD., Tokyo (JP)

(72) Inventor: Shinya Murai, Tokyo (JP)

(73) Assignee: PARAMOUNT BED CO., LTD., Tokyo (JP)

( * ) Notice: Subject to any disclaimer, the term of this patent is extended or adjusted under 35 U.S.C. 154(b) by 0 days.

(21) Appl. No.: 16/322,007

(22) PCT Filed: Nov. 22, 2017

(86) PCT No.: PCT/JP2017/042038
§ 371 (c)(1),
(2) Date: Jan. 30, 2019

(87) PCT Pub. No.: WO2018/097187
PCT Pub. Date: May 31, 2018

(65) Prior Publication Data
US 2019/0183413 A1    Jun. 20, 2019

(30) Foreign Application Priority Data
Nov. 22, 2016    (JP) ................................. 2016-227223

(51) Int. Cl.
*A61B 5/00*    (2006.01)
*A61B 5/0245*    (2006.01)
*A61B 5/11*    (2006.01)

(52) U.S. Cl.
CPC .............. *A61B 5/4809* (2013.01); *A61B 5/00* (2013.01); *A61B 5/0245* (2013.01); *A61B 5/11* (2013.01); *A61B 5/6892* (2013.01); *A61B 5/7221* (2013.01)

(58) Field of Classification Search
CPC .... A61B 5/4809; A61B 5/6892; A61B 5/7221
See application file for complete search history.

(56) References Cited

U.S. PATENT DOCUMENTS 5,588,425 A * 12/1996 Sackner ............... A61B 5/0245
600/513
6,030,342 A * 2/2000 Amano ................ A61B 5/4866
600/549

(Continued)

FOREIGN PATENT DOCUMENTS

CN    103284708 A    9/2013
JP    2004-528913 A    9/2004

(Continued)

OTHER PUBLICATIONS

Takemura et al., "Artificial Respiration Monitoring Using a Non-contact Respiratory Movement Monitoring System," The transactions of the Institute of Electronics, Information and Communication Engineers, Oct. 1, 2005, No. 10, pp. 2152-2162, ISSN 0915-1923.

*Primary Examiner* — John R Downey
(74) *Attorney, Agent, or Firm* — BIRCH, STEWART, KOLASCH & BIRCH, LLP

(57) ABSTRACT

This terminal device is provided with: a biological signal acquisition unit which acquires a biological signal of a person to be measured; a biological information acquisition unit which acquires, on the basis of the acquired biological signal, biological information on the person to be measured; a determination unit which determines whether the biological information on the person to be measured is accurate in the time period in which the biological signal is measured; and a control unit which changes the handling of the biological signal or the biological information according to the determination result from the determination unit.

5 Claims, 6 Drawing Sheets

(56) References Cited

U.S. PATENT DOCUMENTS

| | | | | |
|---|---|---|---|---|
| 8,571,893 B2* | 10/2013 | Dashefsky | G16H 50/20 | 600/301 |
| 2003/0236474 A1* | 12/2003 | Singh | A61B 5/6892 | 600/595 |
| 2006/0169282 A1* | 8/2006 | Izumi | A61B 5/11 | 128/204.23 |
| 2006/0200011 A1* | 9/2006 | Suzuki | A61B 5/02125 | 600/301 |
| 2007/0118054 A1* | 5/2007 | Pinhas | A61B 5/4815 | 600/587 |
| 2007/0161917 A1* | 7/2007 | Ozaki | A61B 5/6892 | 600/529 |
| 2009/0112069 A1* | 4/2009 | Kanamori | A61B 5/1118 | 600/300 |
| 2010/0030118 A1* | 2/2010 | Hiei | A61B 5/4809 | 600/595 |
| 2010/0168812 A1* | 7/2010 | Blomqvist | A61B 5/076 | 600/300 |
| 2013/0226010 A1 | 8/2013 | Hotta | | |
| 2014/0276227 A1* | 9/2014 | Perez | A61B 5/7455 | 600/586 |
| 2015/0106124 A1* | 4/2015 | Cosentino | G16H 10/60 | 705/3 |
| 2015/0141852 A1* | 5/2015 | Dusanter | A61G 7/05 | 600/484 |
| 2015/0216458 A1* | 8/2015 | Kasahara | A61B 5/743 | 600/316 |
| 2016/0007868 A1 | 1/2016 | Takahashi | | |
| 2016/0007916 A1* | 1/2016 | Iwawaki | A61B 5/0205 | 600/301 |
| 2016/0058428 A1* | 3/2016 | Shinar | A61B 5/7267 | 600/301 |
| 2016/0081615 A1* | 3/2016 | Chen | A61B 5/024 | 340/575 |

FOREIGN PATENT DOCUMENTS

| | | |
|---|---|---|
| JP | 2010-94216 A | 4/2010 |
| JP | 2011-62335 A | 3/2011 |
| JP | 2011-206285 A | 10/2011 |
| JP | 5748290 B2 | 7/2015 |

* cited by examiner

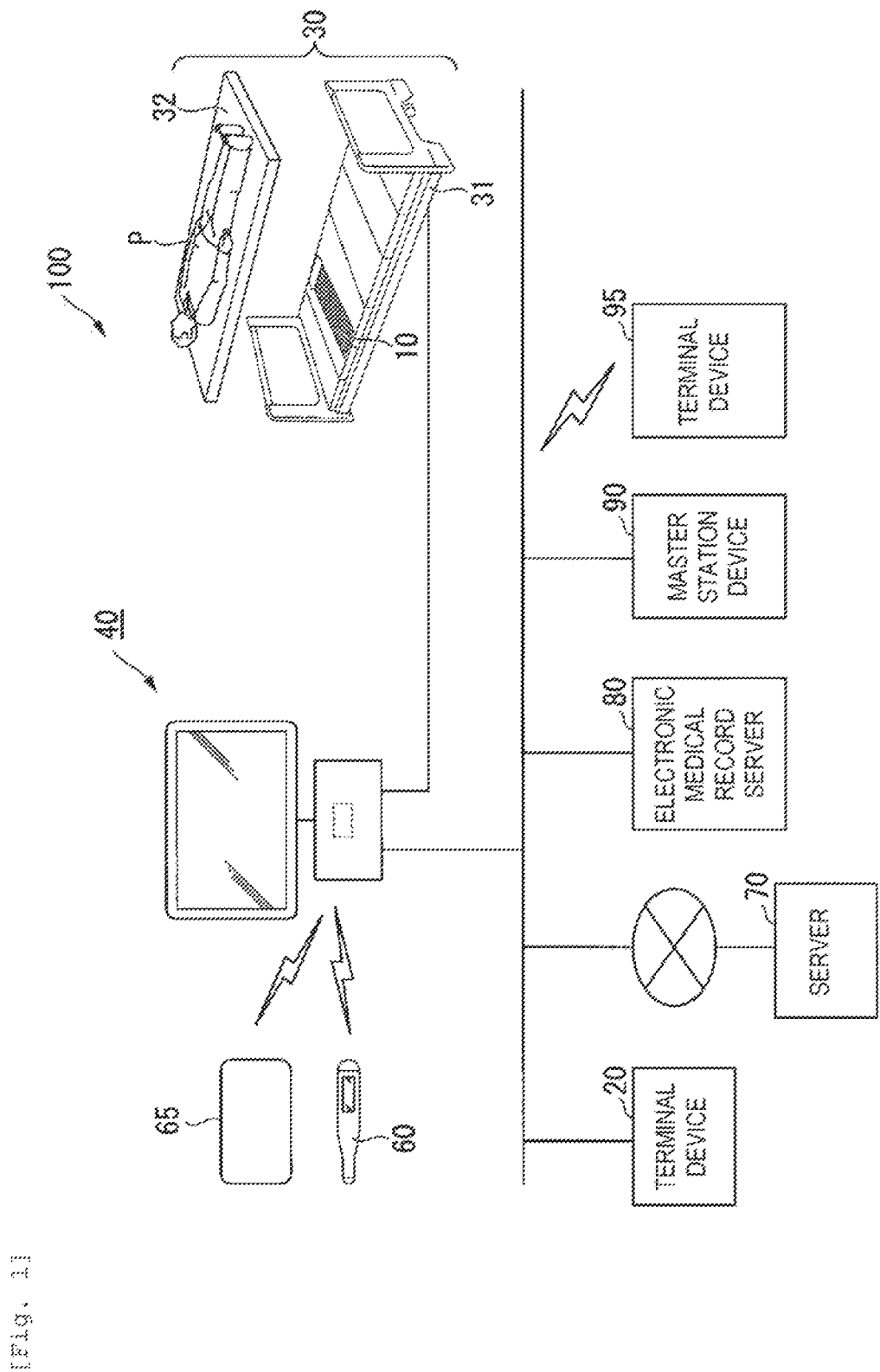

[Fig. 2]
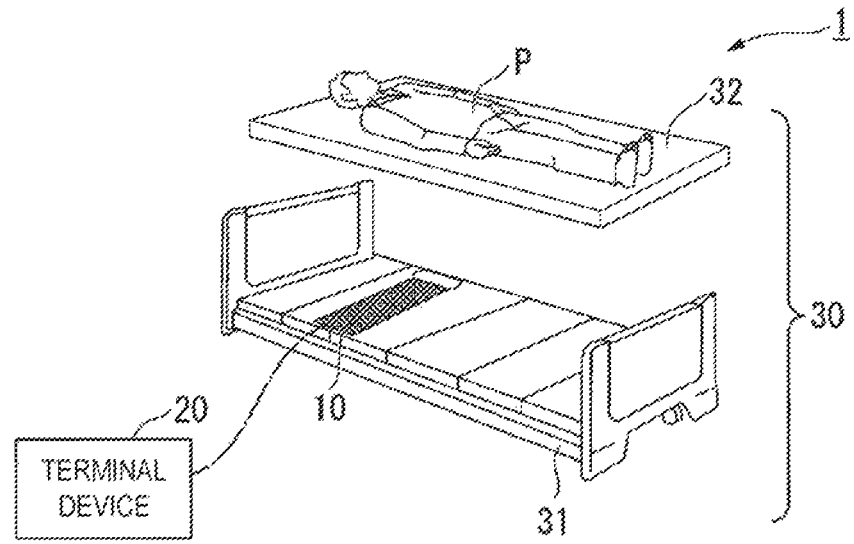
[Fig. 3]
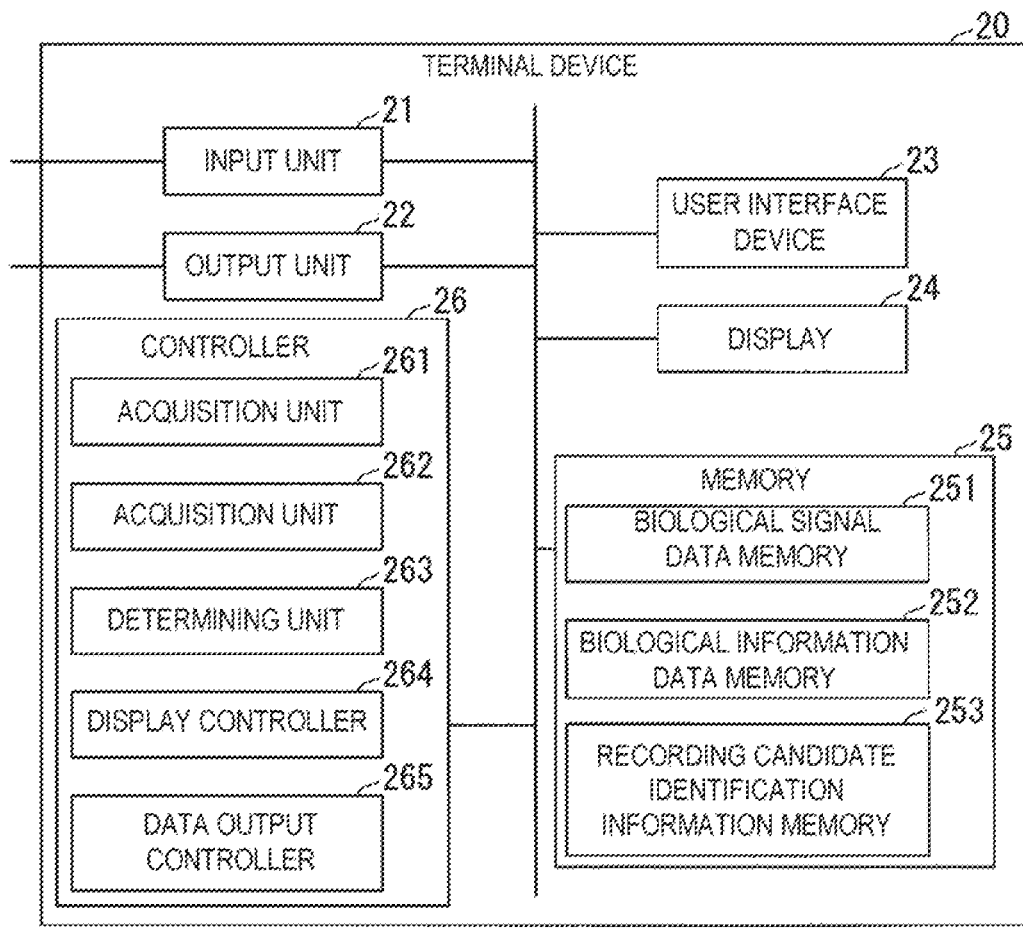

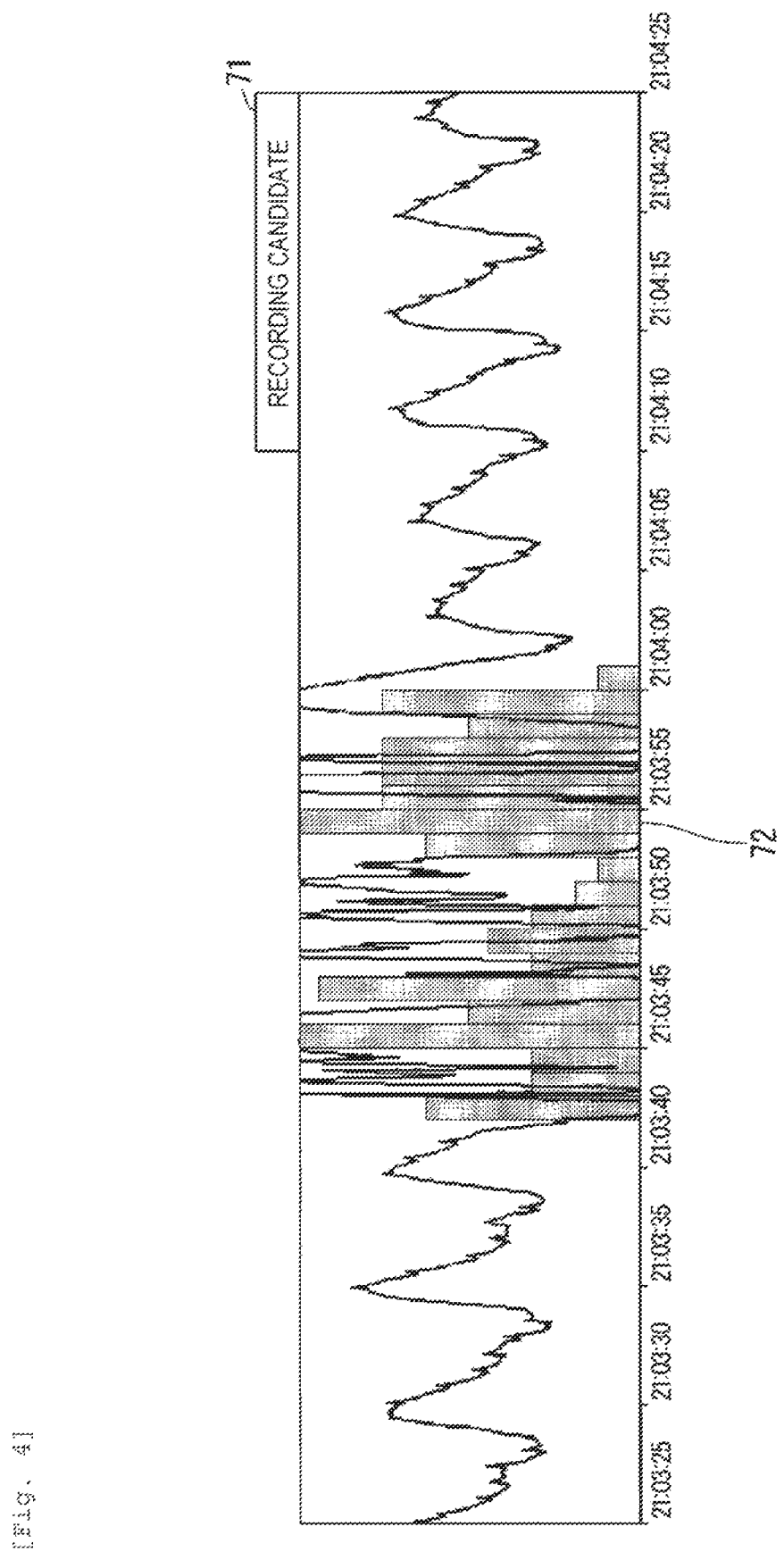

[Fig. 5A]
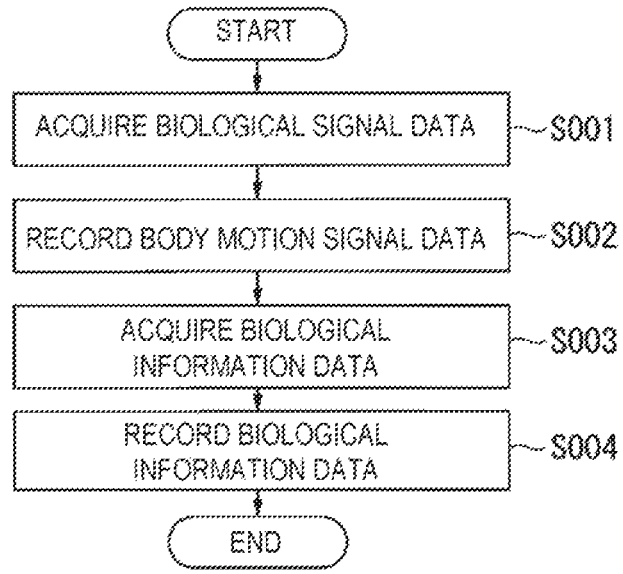
[Fig. 5B]
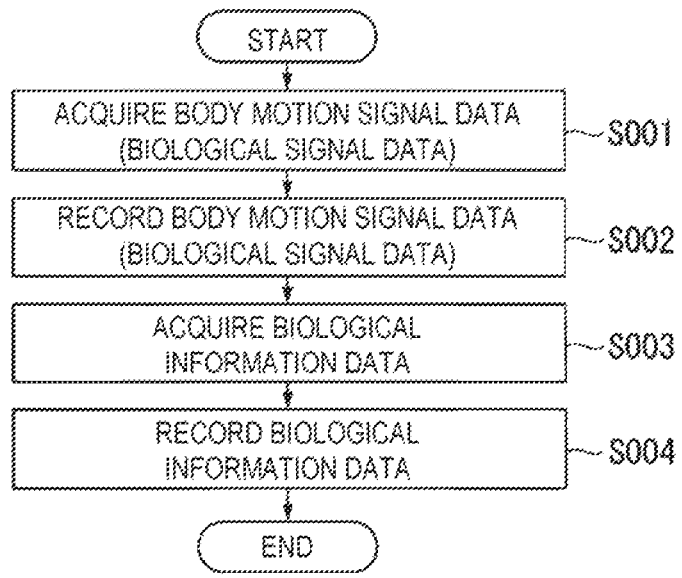

[Fig. 6]
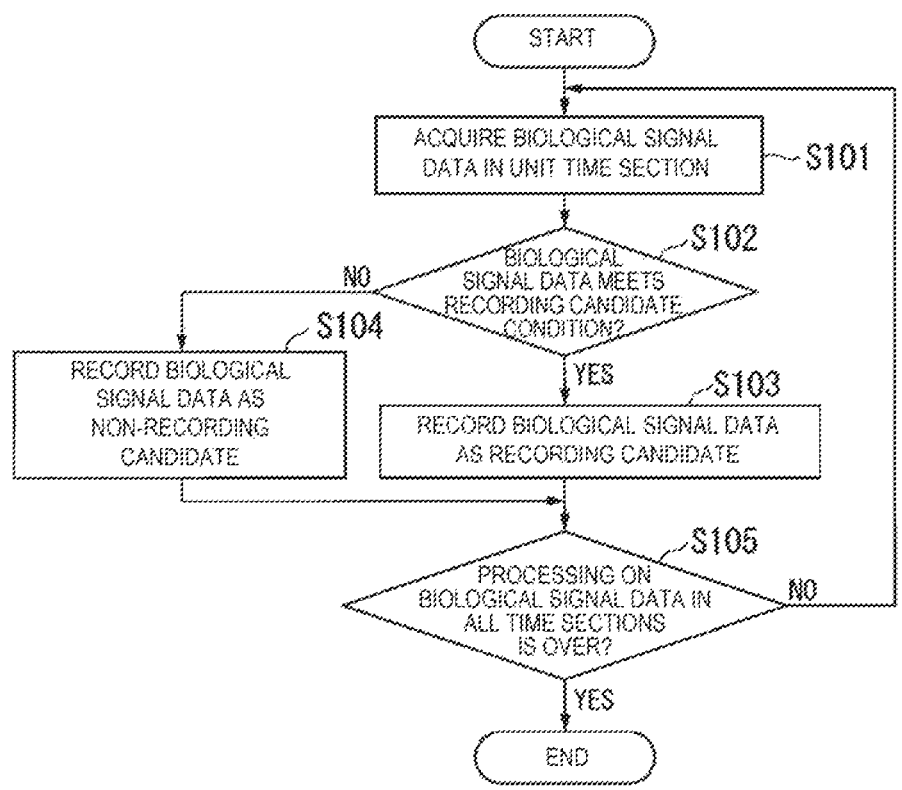

[Fig. 7]
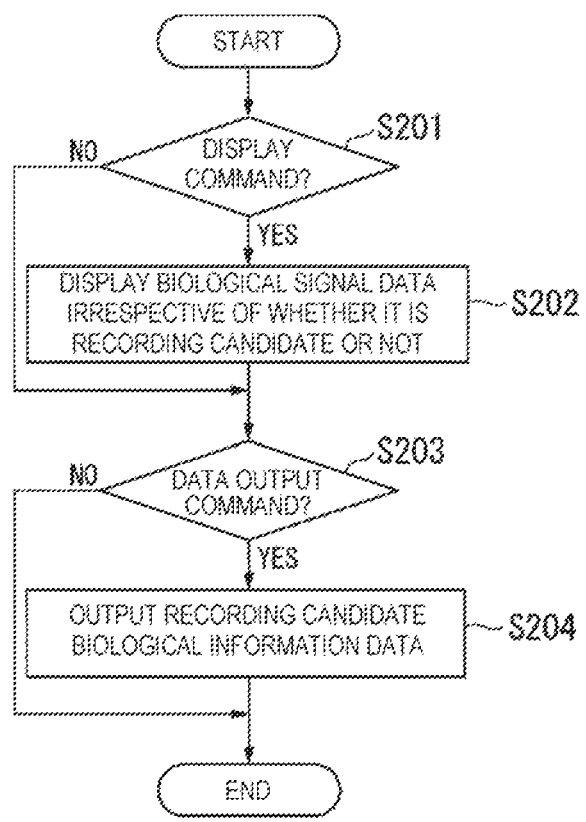

TERMINAL DEVICE, OUTPUT METHOD AND COMPUTER PROGRAM

TECHNICAL FIELD

The present invention relates to a technique to output a biological signal or biological information.

This application claims priority based on Japanese Patent Application No. 2016-227223 filed in Japan on Nov. 22, 2016, the contents of which are incorporated herein by reference.

BACKGROUND ART

There are provided devices for acquiring biological information (such as a heart rate and a breathing rate) of a patient. Examples of such devices include: a wearable device for a patient to wear to measure a heart rate and a breathing rate; and a non-wearable device for measuring a heart rate and a breathing rate based on vibrations. Such biological information is sometimes required to have accuracy with a predetermined reference value or more. For this reason, in order to improve accuracy, there is provided a technique of removing noise from measurement data and acquiring biological information from remaining measurement data after the noise removal (see PTL 1).

CITATION LIST

Patent Literature

PTL 1: Japanese Patent Application Publication No. 2011-206285

SUMMARY OF INVENTION

Technical Problem

Measurement data before noise removal is extremely vast, and accurate biological information after the noise removal still has an extremely large amount of information. Thus, it requires great work to select information to be recorded out of biological information acquired from a patient. A biological signal (a signal acquired by a biological sensor) being an original data of biological information also has a common problem.

The present invention has been made in view of the above circumstances and aims to provide a technique which makes it possible to easily select, from a biological signal or biological information acquired from a patient, a biological signal or biological information more suitable for recording.

Solution to Problem (1) A terminal device according to an aspect of the present invention includes: a biological signal acquisition unit configured to acquire a biological signal of a patient; a biological information acquisition unit configured to acquire biological information of the patient based on the acquired biological signal; a determining unit configured to determine whether or not the biological information of the patient is accurate in a time section in which the biological signal is measured; and a controller configured to change handling of the biological signal or the biological information in accordance with a determination result of the determining unit.

(2) In the terminal device of (1) above, the controller may include a display controller configured to display, when displaying the biological signal or the biological information on a display, the biological signal or the biological information irrespective of the determination result.

(3) In the terminal device of (1) or (2) above, the controller may include a data output controller configured to output data on the biological signal or the biological information determined to be accurate by the determining unit.

(4) In the terminal device of (2) above, the display controller may display the biological signal or the biological information in different ways depending on whether or not the biological signal or the biological information is determined to be accurate by the determining unit.

(5) An output method according to an aspect of the present invention includes: a biological signal acquisition step for acquiring a biological signal of a patient; a biological information acquisition step for acquiring biological information of the patient based on the acquired biological signal; a determination step for determining whether or not the biological information of the patient is accurate in a time section in which the biological signal is measured; and a control step for changing handling of the biological signal or the biological information in accordance with a determination result in the determination step.

(6) A computer program according to an aspect of the present invention causes a computer to function as a terminal device including: a biological signal acquisition unit configured to acquire a biological signal of a patient; a biological information acquisition unit configured to acquire biological information of the patient based on the acquired biological signal; a determining unit configured to determine whether or not the biological information of the patient is accurate in a time section in which the biological signal is measured; and a controller configured to change handling of the biological signal or the biological information in accordance with a determination result of the determining unit.

Advantageous Effects of Invention

According to the embodiments of the present invention described above, it is possible to easily select, from a biological signal or biological information acquired from a patient, a biological signal or biological information more suitable for recording.

BRIEF DESCRIPTION OF DRAWINGS

FIG. 1 is a diagram illustrating an example of a system configuration of a state display system 100 according to an embodiment of the present invention.

FIG. 2 is a diagram illustrating an example of the system configuration of a measuring system 1.

FIG. 3 is a schematic block diagram illustrating a functional configuration example of a terminal device 20.

FIG. 4 is a diagram illustrating a display example of a display 24.

FIG. 5A is a flowchart illustrating an operation example of the terminal device 20 at the time of recording biological information data.

FIG. 5B is another flowchart illustrating an operation example of the terminal device 20 at the time of recording biological information data.

FIG. 6 is a flowchart illustrating an operation example of the terminal device 20 at the time of recording recording candidate identification information.

FIG. 7 is a flowchart illustrating an operation example of the terminal device 20 at the time of display or data output.

DESCRIPTION OF EMBODIMENTS

First, the entire system in this embodiment will be described. FIG. 1 is a diagram for explaining the entire state display system 100. A person to be measured (hereinafter referred to as a "patient") P is laid on a mattress 32 placed on a bed 30. The bed 30 is provided with a detector 10. The detector 10 is connected to a user interface device 40.

The user interface device 40 is connected to the detector 10, connected to a measuring device 60 (e.g. devices such as a thermometer and a sphygmomanometer), and connected to other server devices etc. via a network. Besides, authentication processing (login processing) can be done by placing an ID card 65 over the user interface device 40.

For example, the terminal device 20, a server 70, an electronic medical record server 80, a master station device 90, and a terminal device 95 are connected to the network. The server 70 is a server that provides various services, and may be connected to a LAN inside a facility such as a hospital or may be provided outside via the Internet. The electronic medical record server 80 is a server that stores electronic medical record information on the patient P. The electronic medical record server 80 may be provided in an outside cloud server.

The master station device 90 is disposed in an area (area inside the facility) such as a nurses' station. By using the master station device 90, it is possible to know the state of the user interface device 40 at a location away from the user interface device 40. The terminal device 95 can be connected to a LAN by wireless communication, for example, so that employees such as nurses and care staffs can easily check the information of the user interface device 40.

FIG. 2 is a diagram illustrating an example of the system configuration of a measuring system 1. The measuring system 1 may be configured as a part of the state display system 100. The measuring system 1 is configured to measure biological information on the patient P. The measuring system 1 includes the detector 10 and the terminal device 20.

The detector 10 is a device configured to acquire a biological signal of the patient P. The detector 10 has a pressure sensor for detecting the body motion of the patient P. The detector 10 outputs a signal representing the body motion that is detected by the pressure sensor. In other words, in this embodiment, the detector 10 outputs the signal representing the body motion (body motion signal) as a biological signal.

By using the biological signal output from the detector 10, various kinds of biological information on the patient P can be acquired. For example, information on the laid-down state of the patient P can be acquired based on the biological signal. The information on the laid-down state indicates whether the patient P is laid down or not. The information on the laid-down state may further indicate whether the patient is on the bed or not, whether the patient is away from the bed or not, and whether the patient is sitting on the bed side or not. Based on the biological signal, it is also possible to acquire information on whether the patient P is sleeping or awake.

The detector 10 is provided to the bed 30. For example, the detector 10 may be disposed between sections 31 and the mattress 32 that constitute the bed 30. The detector 10 is formed in the shape of a thin sheet. This makes it possible to perform measurement without letting the patient P feel a sense of discomfort even when the detector 10 is placed between the sections 31 and the mattress 32.

Once the patient P gets on the mattress 32, the detector 10 detects a body motion (vibration) as a biological signal of the patient P. The detector 10 outputs the biological signal thus detected. The patient P may be a sick person who is under medical treatment or may be a person who needs nursing care. The patient P may be a healthy person who needs no nursing care. The patient P may be an elderly person or may be a child. The patient P may be a disabled person. The patient P does not necessarily have to be a human and may be an animal other than a human.

The terminal device 20 is constituted of an information processor. The terminal device 20 includes a CPU (Central Processing Unit), a memory, and an auxiliary memory device that are connected to each other via a bus. The terminal device 20 operates by executing a program. The terminal device 20 performs processing based on the biological signal acquired by the detector 10. Hereinbelow, the detailed configuration of the terminal device 20 will be described.

FIG. 3 is a schematic block diagram illustrating a functional configuration example of the terminal device 20. The terminal device 20 includes: an input unit 21; an output unit 22; a user interface device 23; a display 24; a memory 25; and a controller 26.

The input unit 21 accepts data on biological signals input to the terminal device 20 (hereinafter referred to as the "biological signal data"). The input unit 21 may retrieve biological signal data recorded in a recording medium such as a CD-ROM or a USB memory (Universal Serial Bus Memory). In this case, in the recording medium, biological signal data which is time-series data on biological signals detected by the detector 10 is recorded. The input unit 21 may receive biological signal data from the detector 10 by wired or wireless communication. The input unit 21 may have any configuration as long as it can receive input of biological signal data acquired by the detector 10.

The output unit 22 outputs data from the terminal device 20 in such a way that the data is readable by other devices. The output unit 22 may output data by recording data in a recording medium such as a CD-ROM or a USB memory. The output unit 22 may output data by sending data to other devices by wired or wireless communication. The output unit 22 may have any configuration as long as it can output data from the terminal device 20 to other devices.

The user interface device 23 is configured using existing input devices such as a keyboard, a pointing device (e.g. mouse, tablet), a button, and a touch panel. The user interface device 23 is manipulated by a user when the user inputs his/her command to the terminal device 20. The user interface device 23 may be an interface for connecting the input devices to the terminal device 20. In this case, the user interface device 23 inputs, to the terminal device 20, an input signal generated in each input device in response to input from the user. The user interface device 23 may be configured as an integrated touch panel with the display 24.

The display 24 is an image display device such as a CRT (Cathode Ray Tube) display, a liquid crystal display, and an organic EL (Electro Luminescence) display. The display 24 is configured to display images and characters thereon. The display 24 may be an interface for connecting an image display device to the terminal device 20. In this case, the display 24 generates an image signal for displaying images and characters, and outputs the image signal to the image display device connected thereto.

The memory 25 is configured using a storage device such as a magnetic hard disk device and a semiconductor storage device. The memory 25 functions as a biological signal data memory 251, a biological information data memory 252, and a recording candidate identification information memory 253.

The biological signal data memory 251 is configured to store biological signal data acquired by the controller 26.

The biological information data memory 252 is configured to store biological information data acquired by the controller 26.

The recording candidate identification information memory 253 is configured to store identification information, indicating whether data is a candidate for recording or not, which is determined by the controller 26 (such information is hereinafter referred to as "recording candidate identification information").

The controller 26 is configured using a CPU. By executing programs, the controller 26 functions as an acquisition unit 261, an acquisition unit 262, a determining unit 263, a display controller 264, and a data output controller 265.

The acquisition unit 261 is configured to acquire biological signal data input via the input unit 21. The acquisition unit 261 records the acquired biological signal data in the biological signal data memory 251.

The acquisition unit 262 is configured to acquire biological information data based on the biological signal data stored in the biological signal data memory 251. The biological information data is time-series data on biological information. For example, the acquisition unit 262 acquires the breathing rate and heart rate of the patient P as biological information. The acquisition unit 262 may acquire biological information in any way. For example, the acquisition unit 262 may extract a breathing component and a heartbeat component from a biological signal and acquire a breathing rate and a heart rate based on a breathing interval and a heartbeat interval. For example, the acquisition unit 262 may analyze (e.g. the Fourier transform) the periodicity of body motion (a body motion signal which is also a biological signal in this embodiment) and calculate a breathing rate and a heart rate from a peak frequency. The acquisition unit 262 records the acquired biological information data in the biological information data memory 252.

The determining unit 263 is configured to determine data which satisfies a recording candidate condition, on the basis of the biological signal data (which is also body motion signal data in this embodiment) recorded in the biological signal data memory 251 or the biological information data recorded in the biological information data memory 252. The recording candidate condition is a condition indicating that data in question is information preferably recorded as predetermined information (such as an electronic medical record). In other words, the recording candidate condition is a condition indicating whether the biological information is accurate or not, and data that is determined by the determining unit 263 to satisfy the recording candidate condition is data that is determined by the determining unit 263 to be accurate. More specifically, the recording candidate condition is a condition indicating that, among the biological signal data or the biological information data, data is biological signal data or biological information data that indicates the body condition of the patient P accurately based on predetermined criteria. For example, the recording candidate condition may be the fact that variation of values (e.g. biological signal data or biological information data) over a predetermined time period or more is smaller than a predetermined threshold. For example, the recording candidate condition may be the fact that data is one within a time section in which the patient P is presumed to be sleeping (such a time section is hereinafter referred to as the "sleep time section"). For example, the recording candidate condition may be the fact that data is one (e.g. biological signal data or biological information data) recorded within a predetermined time period before present and that data has values (e.g. biological signal data or biological information data) whose variation over a predetermined time period or more is smaller than a predetermined threshold. For example, the recording candidate condition may be the fact that a proportion of a time period, in which biological signal data or biological information data is successfully acquired normally, to a certain time period exceeds a predetermined threshold. For example, the recording candidate condition may be the fact that the average value or medium value of values (e.g. biological signal data or biological information data) acquired in a certain time period is successively obtained. In this case, the average value or medium value thus obtained may be recorded. Here, at the time of calculating the average value or medium value, it is possible not to use a value with a large deviation. The multiple specific examples of the condition described above may be joined by AND conditions and used as the recording candidate condition.

A specific example of processing performed by the determining unit 263 will be described. For example, the determining unit 263 retrieves biological signal data of a predetermined time width (hereinafter referred to as the "unit time section") from the biological signal data recorded in the biological signal data memory 251. For example, the unit time section may be 0.1 seconds, may be 1 second, may be 5 seconds, may be 1 minute, or may be another value. The determining unit 263 determines whether the biological signal data in the unit time section satisfies the recording candidate condition or not, i.e., whether the biological signal data in the unit time section is accurate or not. The determining unit 263 records, in the recording candidate identification information memory 253, recording candidate identification information indicating a determination result in each unit time section. In each unit time section, the recording candidate identification information indicates whether data in this time section satisfies the recording candidate condition or not.

In each unit time section, whether data in this time section satisfies the recording candidate condition or not may be determined based on whether this time section is the sleep time section or not. Here, when the fact that data is one in the sleep time section is the recording candidate condition, any technique may be employed as a technique for the determining unit 263 to determine whether the biological signal data is one in the sleep time section or not. For example, the determining unit 263 may calculate the number of vibrations of the body motion signal (which is also the biological signal in this embodiment) in the unit time section (e.g. the number of vertical oscillations of the body motion signal (biological signal) with a predetermined magnitude or larger) and determine that the data is in the sleep time section when the number of oscillations falls below a threshold. For example, the determining unit 263 may determine that the data is in the sleep time section when an accumulated value (e.g. integrated value) of variations in the signal (body motion signal, biological signal) in the unit time section falls below a threshold.

The display controller 264 is configured to control display on the display 24. When displaying the biological signal on the display 24, the display controller 264 displays the biological signal irrespective of the determination result of the determining unit 263. The display controller 264 displays the biological signal satisfying the recording candidate condition in a different way from the biological signal not satisfying the recording candidate condition. For example, the type (e.g. solid line, dotted line, broken line, dashed dotted line, dashed-two dotted line) of a line representing the signal may be different. For example, the thickness or color of a line representing the signal may be different. For example, the background color of a line representing the signal may be different. For example, identifiable characters such as "recording candidate" may be displayed in a time section in which the biological signal satisfying the recording candidate condition is recorded. Besides those, the biological signal satisfying the recording candidate condition may be displayed in any way as long as the biological signal satisfying the recording candidate condition and the biological signal not satisfying the recording candidate condition are distinguishable from each other.

When displaying the biological information on the display 24, the display controller 264 also displays the biological information irrespective of whether this is the biological information satisfying the recording candidate condition or not. The display controller 264 displays the biological information satisfying the recording candidate condition in a different way from the biological information not satisfying the recording candidate condition. For example, different images (pictograms) may be displayed depending on whether the biological information satisfies the recording candidate condition or not. For example, the font, thickness, or color of a character to be used may be different. For example, the color of a frame where the biological information is displayed or the background color of the biological information may be different. Besides those, the biological information satisfying the recording candidate condition may be displayed in any way as long as the biological information satisfying the recording candidate condition and the biological information not satisfying the recording candidate condition are distinguishable from each other.

The data output controller 265 is configured to control data output via the output unit 22. In the case of outputting biological signal data, the data output controller 265 outputs the biological signal data satisfying the recording candidate condition. In the case of outputting biological information data, the data output controller 265 outputs the biological information data satisfying the recording candidate condition.

The display controller 264 and the data output controller 265 are a specific example of the controller of the present invention. The controller 26 changes the handling of the biological signal or the biological information according to the determination result of the determining unit 263.

FIG. 4 is a diagram illustrating a display example of the display 24. In the example of FIG. 4, a time-series waveform of a biological signal detected by the detector 10 during a time period between $21^h3^m25^s$ and $21^h4^m25^s$ is displayed. FIG. 4 illustrates the result of determination performed with a unit time section set at 1 second. In the time section of the time axis during which the biological signal is displayed, a time section between $21^h4^m10^s$ and $21^h4^m25^s$ is displayed as the recording candidate. Specifically, a rectangle 71 that includes characters indicating the recording candidate and extends along the time axis is displayed over the time section where the data satisfying the recording candidate condition is recorded. In addition, in FIG. 4, a bar 72 indicating the amount of activity of the patient P that is obtained based on the body motion signal (which is also the biological signal in this embodiment) is displayed for every unit time section over an awakening time section. The awakening time section is a time section during which a large body motion occurs. In other words, the awakening time section is a time section during which the amount of activity of the patient P is so large that the patient P is presumed to be awake.

In this embodiment, the amount of activity of the patient P indicated by the bar 72 is obtained based on the body motion signal as described above. For example, the amount of activity is obtained based on information such as a body motion signal, biological information on breathing and heartbeat, and body motion information obtained by excluding the influence of breathing and heartbeat from the body motion signal. The body motion information is associated with a substantial body motion not including a body motion caused by breathing and a body motion caused by heartbeat. Examples of such a substantial body motion include roll-over in the bed (including unconscious roll-over while one is sleeping and conscious roll-over while one is awake).

The amount of activity depends largely on the amount of substantial body motion. In ranges where no bar 72 is illustrated (e.g. $21^h3^m42^s$ or earlier and $21^h4^m2^s$ or later) in FIG. 4, a substantial body motion is so little that no amount of activity is detected. In these ranges, the waveform indicating the biological signal (which is also the body motion signal in this embodiment) in FIG. 4 is stable, and thus it can be presumed that the patient P is sleeping (in a state of little substantial body motion), for example. On the other hand, in a range where the bar 72 is illustrated (e.g. $21^h3^m43^s$ to $21^h4^m1^s$) in FIG. 4, a substantial body motion occurs and a large amount of activity is detected. In this range, the waveform indicating the biological signal (which is also the body motion signal in this embodiment) in FIG. 4 is unstable, and thus it can be presumed that the patient P is awake (in a state of large substantial body motion), for example.

As described above, whether data is in the sleep time section or not (whether data is in the sleep time section or in the awakening time section) can be determined based on the amount of activity, for example, and this amount of activity can be obtained based on the body motion (body motion signal) of the patient P. Accordingly, when determination as to whether specific data is satisfied with the recording candidate condition is performed based on whether the data is in the sleep time section or not, the controller 26 can perform the judgment on the recording candidate condition based on the body motion signal.

Note that, in this embodiment, since the controller 26 acquires the body motion signal as the biological signal, the above judgment can be performed based on the biological signal. However, if a signal different from the body motion signal is acquired as the biological signal as will be described later, it is also possible to acquire a body motion signal in addition to the biological signal for the purpose of performing the above judgment. In this case, the detector can have a configuration including: a first detector configured to detect a body motion signal like the detector 10 of this embodiment; and a second detector different from the first detector and configured to detect a biological signal.

Devices such as a wearable computer and various sensor devices can be used as the second detector, for example.

FIG. 5A is a flowchart illustrating an operation example of the terminal device 20 at the time of recording biological information data. The acquisition unit 261 acquires biological signal data, which is also body motion signal data in this embodiment, via the input unit 21 (Step S001). The acquisition unit 261 records the acquired body motion signal data (which is also the biological signal data in this embodiment as described above) in the biological signal data memory 251 (Step S002). The acquisition unit 262 acquires biological information data based on the biological signal data recorded in the biological signal data memory 251 (Step S003). The acquisition unit 262 records the acquired biological information data in the biological information data memory 252 (Step S004).

Note that, in this embodiment, the body motion signal is acquired as the biological signal. Thus, the controller 26 can acquire data on body motion information (body motion information data) and the amount of activity based on the acquired biological signal data and biological information data. In addition, as illustrated in FIG. 5B, the biological signal data can be acquired by acquiring the body motion signal data in Step S001, and the biological signal data can be recorded by recording the body motion signal data in Step S002. In other words, both the biological signal data and the body motion signal data are acquired in Step S001 and both the biological signal data and the body motion signal data are recorded in Step S002.

Here, when a signal different from the body motion signal is acquired as the biological signal, the biological signal data and the body motion signal data have neither to be acquired at the same timing nor to be recorded at the same timing. For example, the body motion signal data may be acquired and recorded after the biological signal data is acquired and recorded. Instead, the biological signal data may be acquired and recorded after the body motion signal data is acquired and recorded. Here, the acquisition and recording of the biological signal data and the acquisition and recording of the body motion signal data may be synchronized with each other.

FIG. 6 is a flowchart illustrating an operation example of the terminal device 20 at the time of recording recording candidate identification information. The determining unit 263 acquires biological signal data in a unit time section (Step S101). The determining unit 263 executes determination processing on the biological signal data in the unit time section thus acquired (Step S102). In other words, the determining unit 263 determines whether or not the biological signal data in the unit time section thus acquired is satisfied with the recording candidate condition. In this event, in this embodiment, the determination can be performed based on the body motion signal data (biological signal data) recorded in Step S002. If it is determined that the data is satisfied with the recording candidate condition (Step S102—YES), the determining unit 263 records the unit time section, which is being processed, as the recording candidate (Step S103). For example, the determining unit 263 records recording candidate identification information indicating that the unit time section being processed is a recording candidate. On the other hand, if it is determined that the data is not satisfied with the recording candidate condition (Step S102—NO), the determining unit 263 records the unit time section, which is being processed, as a non-recording candidate (information which is not a recording candidate) (Step S104). For example, the determining unit 263 records identification information indicating that the unit time section being processed is not a recording candidate. If it is determined that the determining unit 263 has not completed the above processing on all the time sections of the biological signal data to be processed (Step S105—NO), the determining unit 263 again acquires biological signal data in another unit time section. If it is determined that the determining unit 263 has completed the above processing on all the time sections (Step S105—YES), the processing illustrated in FIG. 6 terminates. In this way, it is determined whether the biological signal data to be processed is a recording candidate or not.

FIG. 7 is a flowchart illustrating an operation example of the terminal device 20 at the time of display or data output. If a display command is input via the user interface device 23 (Step S201—YES), the display controller 264 displays on the display 24 biological signal data in a time section specified by manipulation, irrespective of the determination result of the determining unit 263 (Step S202). If no display command is input via the user interface device 23 (Step S201—NO), the process moves to determination processing in Step S203 without executing the processing in Step S202. If a data output command is input via the user interface device 23 (Step S203—YES), the data output controller 265 outputs the biological signal data, which satisfies the recording candidate condition, via the output unit 22 (Step S204). These processes are not limited to the biological signal data, and the display or data output of biological information data is performed in the same manner. If no data output command is input via the user interface device 23 (Step S203—NO), the processing in FIG. 7 terminates without executing the processing in Step S204.

In the measuring system 1 having the above configuration, among the biological signal or biological information acquired from the patient, the biological signal or biological information satisfying the recording candidate condition is displayed in a different way from the biological signal or biological information not satisfying the recording candidate condition. In addition, if output to another device is directed instead of display, only the biological signal or biological information satisfying the recording candidate condition is output. This makes it possible to easily select a biological signal or biological information more suitable for recording among the biological signal or biological information acquired from the patient.

As one criterion as to whether data is satisfied with the recording candidate condition or not, the determination may be performed based on whether the data is in the sleep time section or not, as described above. The details are as follows. Note that, in this embodiment, each of display and data output is a mode of output.

While one is sleeping, a signal acquired by body motion normally has small fluctuations. Accordingly, a signal in the sleep time section is assumed to have high accuracy. Specifically, in this embodiment, the controller 26 acquires the body motion signal as the biological signal. While the patient P is sleeping, the substantial body motion of the patient is normally small. Thus, the body motion signal acquired while the patient P is sleeping is largely influenced by a body motion based on the breathing and heartbeat of the patient (periodical fluctuations (vibrations) of load) and has small fluctuations. Accordingly, it is assumed that the body motion signal correlates strongly with the biological information in the sleep time section, that is, the body motion signal data in the sleep time section is highly reliable from the perspective of obtaining biological information and thus accurate biological information can be obtained from the biological signal (body motion signal) in the sleep time section. In other words, in the section (e.g. the range where no bar 72 is illustrated in FIG. 4) where the body motion and the amount of activity are determined to be small based on the body motion signal, it is assumed that biological signal data is highly reliable and biological information can be obtained from the biological signal accurately.

On the other hand, while one is awake, a signal acquired by body motion normally has large fluctuations. Accordingly, a signal in the awakening time section is assumed to have low accuracy. Specifically, while one is awake, a substantial body motion is normally larger than while one is sleeping. Thus, the body motion signal acquired while the patient P is awake is largely influenced by the substantial body motion of the patient and has large fluctuations. Accordingly, it is assumed that the body motion signal correlates weekly with the biological information in the awakening time section, that is, the body motion signal data in the awakening time section is less reliable from the perspective of obtaining biological information and thus accurate biological information is hard to obtain from the biological signal (body motion signal) in the awakening time section. In other words, in the section (e.g. the range where the bar 72 is illustrated in FIG. 4) where the body motion and the amount of activity are determined to be large based on the body motion signal, it is assumed that biological signal data is less reliable and accurate biological information is hard to obtain from the biological signal. Note that, in a less reliable time section, it is also possible to supplement data by receiving biological information from another (wearable) device.

For this reason, whether one is sleeping or not may be used as the recording candidate condition. Here, if it is assumed that, even when one is sleeping (in the sleep time section), the signal has lower accuracy (reliability) immediately after one falls asleep or immediately before one awakes than other time points during sleep, biological signal data and biological information data immediately after one falls asleep or immediately before one awakes may be set as non-recording candidates instead of recording candidates.

In this embodiment, when biological signal data or biological information data (hereinafter collectively referred to as "data") is output for the purpose of analyzing it in another information processor, the data output controller 265 outputs only data satisfying the recording candidate condition. With such a configuration, it is possible to more accurately analyze data acquired by the terminal device 20.

On the other hand, when displaying data on the display 24, the display controller 264 displays not only the data satisfying the recording candidate condition but also the data not satisfying the recording candidate condition. Thereby, the user who references the data displayed on the display can reference successive data instead of data which is intermittent in the time axis. This makes it possible to determine a change in the biological signal or biological information more suitably.

In addition, when displaying data on the display 24, the display controller 264 displays the data satisfying the recording candidate condition and the data not satisfying the recording candidate condition in different ways. Thereby, the user who references the data displayed on the display 24 can reference successive data while knowing which time section's data is likely to be highly accurate and which time section's data is likely to be less accurate. This enables the user to determine a change in the biological signal or biological information more suitably.

Modified Example

The detector 10 may have any configuration as long as it can acquire the biological signal of the patient P. In other words, a pressure sensor does not necessarily have to be used in the detector 10. For example, a load sensor may be used in the detector 10. In addition, the biological signal acquired by the detector 10 does not necessarily have to be a signal based on body motion (body motion signal). Specific examples of the biological signal include a signal base on breathing movement and a signal based on ballistocardiographic movement. For example, the biological signal may be acquired using an infrared sensor. For example, the biological signal may be acquired using an actuator with strain gauge. For example, the biological signal may be acquired using a microphone.

The determining unit 263 may determine whether data is satisfied with the recording candidate condition based on biological information acquired by another device instead of biological information based on the biological signal acquired by the detector 10.

When directed via the user interface device 23 not to display the biological signal and biological information not satisfying the recording candidate condition, the display controller 264 may be configured to display the biological signal or biological information satisfying the recording candidate condition and not to display the biological signal and biological information not satisfying the recording candidate condition.

When showing the current biological information of the patient P on the display 24, the display controller 264 may create a display screen based on biological information obtained at the time closest to the current time among the biological information satisfying the recording candidate condition. In this case, even if there is biological information, not satisfying the recording candidate condition, obtained at the time closer to the current time, the display controller creates a display screen based on not this biological information but the biological information satisfying the recording candidate condition. With such a configuration, it is possible to provide the user with more accurate information.

A part of or all of the function parts included in the terminal device 20 may be provided in the detector 10.

The function parts included in the terminal device 20 may be mounted in multiple devices.

All of or a part of the functions included in the terminal device 20 described above may be implemented using hardware such as an ASIC (Application Specific Integrated Circuit), a PLD (Programmable Logic Device), and an FPGA (Field Programmable Gate Array). The programs executed by the terminal device 20 described above may be recorded in a computer-readable recording medium. The computer-readable recording medium is a storage device including: a portable medium such as a flexible disk, a magnetic optical disk, a ROM, and a CD-ROM; and hard disk embedded in a computer system. Each program may be transmitted via an electrical communication line.

Hereinabove, a preferred embodiment of the present invention has been described; however, the present invention is not limited to these embodiment and modified example. Addition, omission, replacement, and other changes of the configuration can be made without departing from the gist of the present invention.

In addition, the present invention is not limited by the aforementioned description and limited only by the appended scope of claims.

INDUSTRIAL APPLICABILITY

According to the above embodiment, it is possible to easily select, from a biological signal or biological information acquired from a patient, a biological signal or biological information more suitable for recording.

REFERENCE SIGNS LIST

1: measuring system
10: detector
20: terminal device
21: input unit
22: output unit
23: user interface device
24: display
25: memory
251: biological signal data memory
252: biological information data memory
253: recording candidate identification information memory
26: controller
261: acquisition unit
262: acquisition unit
263: determining unit
264: display controller
265: data output controller
30: bed
31: sections
32: mattress
P: patient
40: user interface device
60: measuring device
65: ID card
70: server
80: electronic medical record server
90: master station device
95: terminal device.

The invention claimed is:

1. A terminal device for determining whether biological information acquired from body motion signals is to be recorded, the terminal device comprising:
an input unit configured to receive, at predefined time periods, the body motion signals of the patient from a motion sensor device that detects body motion of the patient;
a user interface device including a display; and
a controller configured to
receive the body motion signals of the patient from the motion sensor device,
analyze the received body motion signals to extract biological components including at least one of a breathing component and a heartbeat component extracted from the body motion signals received from the motion sensor during a first time period,
calculate biological information including at least one of a heart rate and a breathing rate of the patient based on the extracted biological components,
determine whether or not the calculated biological information acquired from the biological components extracted from the body motion signals received from the motion sensor device during the first time period is accurate biological information based on whether the patient is determined to be sleeping during the first time period and whether any variation in values of the body motion over the first time period or more is smaller than a first predetermined threshold, and whether a proportion of the first time period in which the biological information is successfully acquired exceeds a second predetermined threshold, the first time period excluding a first period after the patient falls asleep and a second period before the patient awakes;
control the display of the user interface to change the display of the calculated biological information in accordance with whether or not the biological information is determined to be accurate, and
record, in response to receipt of a data output command, the calculated biological information determined to be accurate,
wherein the display is configured to display the calculated biological information irrespective of the determination result such that the controller controls the display to display the calculated biological information in different ways depending on whether or not the calculated biological information is determined to be accurate by the controller, thereby by providing a visual indication of the accuracy of the calculated biological information during respective time periods.

2. A system for determining whether biological information acquired from body motion signals of a patient is to be recorded comprising:
a bed;
a mattress provided on the bed;
a motion sensor configured to detect, at predetermined time periods, body motion of the patient and provide the body motion signals corresponding thereto, the motion sensor being provided between the bed and the mattress;
an input unit configured to receive, at predefined time periods, the body motion signals of the patient from the motion sensor that detects the body motion of the patient;
a user interface device including a display; and
a controller configured to
receive the body motion signals of the patient from the motion sensor,
analyze the received body motion signals to extract biological components including at least one of a breathing component and a heartbeat component,
calculate biological information including at least one of a heart rate and a breathing rate of the patient based on the biological components extracted from the body motion signals received from the motion sensor during a first time period,
determine whether or not the calculated biological information acquired from the biological components extracted from the body motion signals received from the first device during the first time period is accurate biological information based on whether the patient is determined to be sleeping during the first time period and whether any variation in values of the body motion over the first time period or more is smaller than a first predetermined threshold, and whether a proportion of the first time period in which the biological information is successfully acquired exceeds a second predetermined threshold, the first time period excluding a first period after the patient falls asleep and a second period before the patient awakes;
control the display of the user interface change the display of the calculated biological information in accordance with whether or not the biological information is determined to be accurate, and
record, in response to receipt of a data output command, the calculated biological information determined to be accurate, wherein the display is configured to display the calculated biological information irrespective of the determination result such that the controller controls the display to display the calculated biological information in different ways depending on whether or not the calculated biological information is determined to be accurate by the controller, thereby providing a visual indication of the accuracy of the calculated biological information during respective time periods.

3. The terminal device according to claim 2, wherein the controller is configured to determine the calculated biological information is accurate in the first time period if variation of values of the calculated biological information or the received body motion signals over a second time period or more is smaller than a threshold.

4. The terminal device according to claim 2, wherein the controller is configured to determine the calculated biological information is accurate in the first time period if variation of values of the calculated biological information or the received body motion signals over a second time period or more is smaller than a threshold.

5. A non-transitory computer readable medium having stored thereon a program for causing a microprocessor to execute at least the following:

receive, at predetermined time periods, body motion signals of the patient from a motion sensor device that detects body motion of a patient;

analyze the received the body motion signals to extract biological components including at least one of a breathing component and a heartbeat component;

calculate biological information including at least one of a heart rate and a breathing rate of the patient based on the biological components extracted from the body motion signals of the patient received from the motion sensor during a first time period;

determining whether or not the calculated biological information acquired from the biological components extracted from the body motion signals received from the motion sensor device during the first time period is accurate biological information based on whether the patient is determined to be sleeping during the first time period and whether any variation in values of the body motion over the first time period or more is smaller than a first predetermined threshold and whether a proportion of the first time period in which the biological information is successfully acquired exceeds a second predetermined threshold, the first time period excluding a first period immediately after the patient falls asleep and a second period immediately before the patient awakes;

controlling, a display device to change the display of the calculated biological information in accordance with whether or not the calculated biological information is determined to be accurate; and recording, in response to receipt of a data output command, the calculated biological information determined to be accurate, wherein the display device is configured to display the calculated biological information irrespective of the determination result such that the controller controls the display to display the calculated biological information in different ways depending on whether or not the calculated biological information is determined to be accurate, thereby by providing a visual indication of the accuracy of the acquired biological information during respective time periods.

* * * * *